(12) United States Patent
Ophey

(10) Patent No.: US 6,421,183 B1
(45) Date of Patent: Jul. 16, 2002

(54) HEAD-MOUNTED DISPLAY

(75) Inventor: Willem Gerard Ophey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/786,103

(22) PCT Filed: Jun. 27, 2000

(86) PCT No.: PCT/EP00/05949

§ 371 (c)(1),
(2), (4) Date: Feb. 28, 2001

(87) PCT Pub. No.: WO01/02893

PCT Pub. Date: Jan. 11, 2001

(30) Foreign Application Priority Data

Jul. 2, 1999 (EP) .............................................. 99202150

(51) Int. Cl.[7] ........................ G02B 27/14; G02F 1/1335
(52) U.S. Cl. ...................... 359/630; 359/627; 359/633; 359/494; 349/13; 349/98; 349/194
(58) Field of Search ................................ 359/630, 631, 359/633, 634, 301, 627, 246, 259, 857, 484, 485, 494, 495; 349/193, 194, 13, 98, 74

(56) References Cited

U.S. PATENT DOCUMENTS

| | | | |
|---|---|---|---|
| 5,572,343 A | * 11/1996 | Okamura et al. | .............. 349/74 |
| 5,818,641 A | 10/1998 | Takahashi | .................... 359/629 |
| 5,966,242 A | * 10/1999 | Yamanaka | .................... 359/627 |
| 6,094,242 A | * 7/2000 | Yamanaka | .................... 349/13 |
| 6,271,969 B1 | * 8/2001 | Mertz | .......................... 359/630 |
| 6,304,303 B1 | * 10/2001 | Yamanaka | .................... 349/13 |
| 6,318,868 B1 | * 11/2001 | Larussa | ....................... 359/857 |

FOREIGN PATENT DOCUMENTS

| | | | |
|---|---|---|---|
| EP | 0515175 A2 | 11/1992 | |
| EP | 0718645 A2 | 6/1996 | |
| EP | 0803756 A1 | 10/1997 | ........... G02B/27/01 |

* cited by examiner

*Primary Examiner*—Loha Ben

(57) ABSTRACT

The invention relates to a head-mounted display provided with an image display device and an optical system. The optical system comprises a first λ/4 plate, a semi-transmissive mirror, a second λ/4 plate and a polarization-dependent mirror, disposed in the described order from the incident side, for projecting an image to be formed by the image display device on a user's retina.

5 Claims, 1 Drawing Sheet

HEAD-MOUNTED DISPLAY

FIELD OF THE INVENTION

The invention relates to a head-mounted display provided with an image display device and an optical system comprising a semi-transmissive mirror, a lens element, a polarization-dependent mirror and two λ/4 plates for combining light beams so as to project an image to be formed by the image display device on a user's retina.

BACKGROUND AND SUMMARY OF THE INVENTION

A device of the type described above is known from European patent application EP 0 803 756. In a head-mounted display described in this document, an image is formed by means of a liquid crystalline display panel, which image is projected by means of the optical system on the user's retina via the exit pupil of the head-mounted display. During use, the exit pupil coincides with an eye pupil of a user of the head-mounted display, so that an image is formed on the retina. A user may wear the head-mounted display for displaying, for example, TV or video images, or images which are associated with portable information and communication systems, computer games or computer simulations.

In the known head-mounted display, the optical system, viewed from the image display device, consecutively comprises a polarization-dependent mirror, a lens element, a first λ/4 plate, a semi-transmissive mirror, a second λ/4 plate and a polarizer. It is achieved by the polarization-dependent reflection that radiation of the image to be formed effectively passes the lens element three times. Moreover, the first surface of the polarization-dependent mirror may be curved so as to reduce optical imaging errors. To obtain the polarization-dependent mirror, a polarization-dependent layer is provided on the curved surface.

The provision of a polarization-dependent foil on such a curved surface may be a cumbersome process.

It is an object of the invention to provide a head-mounted display which can be manufactured in a relatively simple manner. To this end, the device according to the invention is characterized in that, viewed from the image display device, the first λ/4 plate, the semi-transmissive mirror, the lens element, the second λ/4 plate and the polarization-dependent mirror are placed one behind the other. Due to this order of the optical elements, it is also achieved that the lens element is passed three times by the radiation which ultimately forms the image. Moreover, the semi-transmissive mirror may be formed as a hollow mirror. The advantage of the configuration is that the hollow mirror may be coated with a semi-transmissive layer which can be provided in a conventional and simple manner. The polarization-dependent layer may be provided on a flat plate in a simple manner. This arrangement of the optical elements simplifies the production of the head-mounted display, which has a cost-saving effect. A further advantage as compared with the known device is that a polarizing element placed in the known device as the first element, viewed from the user's side, is not necessary in the head-mounted display according to the invention.

A particular embodiment of the head-mounted display according to the invention is characterized in that an optical axis of the first λ/4 plate is transverse to an optical axis of the second λ/4 plate. As a result, an achromatic transmission suppression is obtained so that the contrast of the image is enhanced. This measure is known per se from the quoted European patent application EP 0 803 756.

A further embodiment of the head-mounted display according to the invention is characterized in that the head-mounted display comprises an integrated optical part in which the semi-transmissive mirror, the lens element, the second λ/4 plate and the polarization-dependent mirror are integrated. Integration of optical components in an optical part simplifies the assembly of the head-mounted display during production.

A further embodiment of the head-mounted display according to the invention is characterized in that the head-mounted display comprises at least an optical element having an aspherical surface. The use of optical elements with aspherical surfaces reduces imaging errors such as coma, astigmatism and curvature of the field.

A further embodiment of the head-mounted display according to the invention is characterized in that the second λ/4 plate and the polarization-dependent mirror have curved surfaces. Consequently, the second λ/4 plate and the polarization-dependent mirror can be simply integrated in an optical part, together with the semi-transmissive mirror and the lens element.

These and other aspects of the invention are apparent from and will be elucidated with reference to the embodiments described hereinafter.

DESCRIPTION OF THE PREFERRED EMBODIMENT

Figure 1:
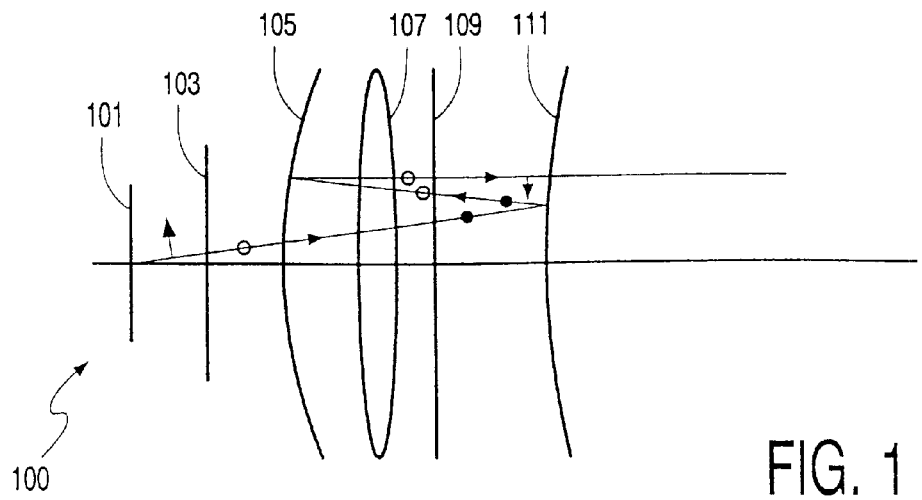
FIG. 1 shows a first embodiment of a head-mounted display according to the invention.

FIG. 1 shows a first embodiment of a head-mounted display 100 in accordance with the invention. FIG. 1 only shows a segment of the head-mounted display, comprising an image display device, for example a transmissive liquid crystalline image display panel 101 with an illumination unit (not shown), and an optical system. Viewed from the image display panel 110, the optical system comprises consecutively a first λ/4 plate 103, a semi-transmissive, preferably hollow, mirror 105, a lens element 107, a second λ/4 plate 109, and a polarization-dependent mirror 111. The polarization-dependent mirror 111 comprises, for example, a reflective polaroid of the type Double Brightness Enhancement Film (DEBF), as supplied by 3M™. The optical system projects an image to be formed by the transmissive liquid crystalline image display panel 101 on a user's retina. FIG. 1 shows the radiation path of a pixel of the image display panel. When the head-mounted display is operative and is worn by the user, radiation of the image formed by the liquid crystalline image display panel 110 will be incident on the first λ/4 plate 103. This first λ/4 plate 103 converts the radiation, polarized in a first direction, into circularly polarized radiation, for example, dextrorotatory polarized radiation which is incident on the semi-transmissive mirror 105. The semi-transmissive mirror 105 passes a part of the dextrorotatory polarized radiation to the second λ/4 plate 109 via the lens element 107. The second λ/4 plate 109 converts the dextrorotatory polarized radiation into radiation polarized in a second direction, which second direction of polarization is transverse to the first direction of polarization. The radiation polarized in the second direction is subsequently incident on the reflective polaroid 111. The reflective polaroid 111 reflects all radiation polarized in the second direction back towards the second λ/4 plate 109. Since the reflective polaroid 111 reflects all of the radiation polarized in the second direction, a further polarizer for enhancing the contrast, as is used in the known head-mounted display, is not necessary. The second λ/4 plate 109 converts the radiation polarized in the second direction into dextrorotatory polarized radiation which is incident on the hollow semi-transmissive mirror 105 via the lens element 107. The semi-transmissive mirror 105 reflects a part of the extrorotatory polarized radiation to the second λ/4 plate 109 via the lens element 107 and changes dextrorotatory polarization into levorotatory polarization. The levorotatory polarized radiation is incident on the second λ/4 plate 109 which converts the levorotatory polarized radiation into radiation polarized in the first direction. The radiation polarized in the first direction is subsequently incident again on the reflective polaroid 111. However, the reflective polaroid 111 passes the radiation which is now polarized in the first direction to a user's eye (not shown). The optical axes of both the first and the second λ/4 plate extend at an angle of 45° to the first direction of polarization.

To obtain an achromatic suppression of transmission for enhancing the contrast of the image, the λ/4 plates 103, 109 may be arranged in such a way that the optical axis of the first λ4 plate 103 is transverse to the optical axis of the second λ/4 plate 109. This arrangement of the optical axes of the first and the second λ/4 plate 103, 109 is known per se from the quoted European patent application EP 0 803 756. An embodiment in which the λ/4 plates are arranged in such a way that the optical axis of the first λ/4 plate is transverse to the optical axis of the second λ/4 plate is shown in FIG. 2.

Figure 2:
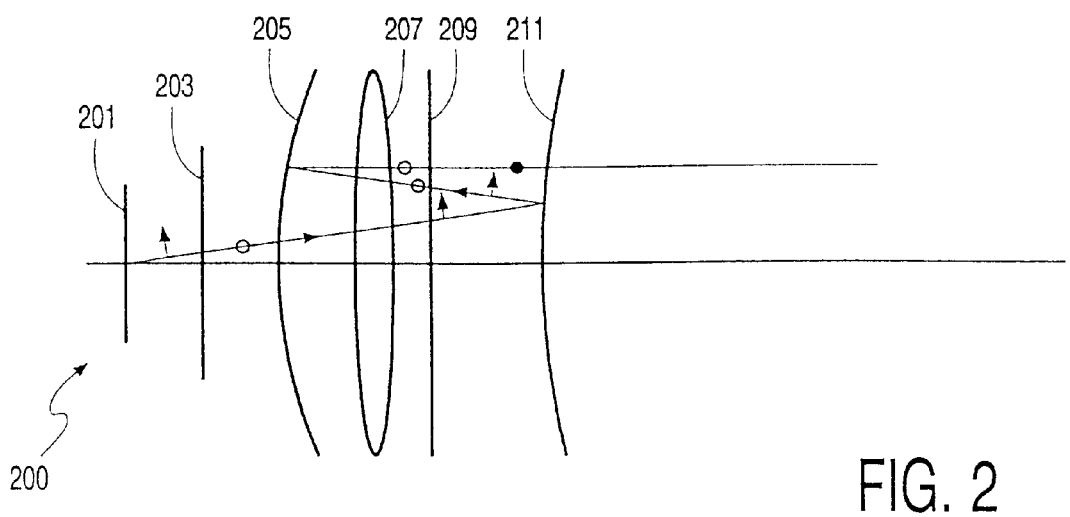
FIG. 2 shows a second embodiment of a head-mounted display according to the invention.

FIG. 2 shows a segment 200 of a head-mounted display in which the arrangement of the optical elements 201–211 is analogous to the arrangement of the elements 101–111, as shown in FIG. 1. However, the optical axes of the first and the second λ/4 plate are situated transversely to each other. When the head-mounted display is operative and is worn by the user, radiation of a pixel of the image formed by the liquid crystalline image display panel 201 will be incident on the first λ/4 plate 203. The angle between the optical axis of the first λ/4 plate 203 and the first direction of polarization is, for example, +45°. This λ/4 plate 203 converts the radiation polarized in a first direction into circularly polarized radiation, for example, dextrorotatory polarized radiation which is incident on the semi-transmissive mirror 205. The semi-transmissive mirror 205 passes a part of the dextrorotatory polarized radiation to the second λ/4 plate 209 via the lens element 207. The optical axis of the second λ/4 plate extends at an angle of −45° with respect to the first direction of polarization and is thus transverse to the optical axis of the first λ/4 plate 203. The second λ/4 plate 209 converts the dextrorotatory polarized radiation into radiation polarized in a first direction. The radiation polarized in the first direction is subsequently incident on the reflective polaroid 211. The reflective polaroid 211 reflects all radiation polarized in the first direction back towards the second λ/4 plate 209. The second λ/4 plate 209 converts the radiation polarized in the first direction into dextrorotatory polarized radiation which is incident on the hollow semi-transmissive mirror 205 via the lens element 207. The semi-transmissive mirror 205 reflects a part of the dextrorotatory polarized radiation back towards the second λ/4 plate 209 via the lens element 207 and changes dextrorotatory polarization into levorotatory polarization. The second λ/4 plate 209 converts the levorotatory polarized radiation into radiation polarized in the second direction which is transverse to the first direction of polarization. The radiation polarized in the second direction is subsequently incident again on the reflective polaroid 211. However, the reflective polaroid 211 now passes the radiation polarized in the second direction to a user's eye (not shown).

Instead of a head-mounted display, in which the optical axis of the first λ/4 plate is transverse to the optical axis of the second λ/4 plate, an achromatic first λ/4 plate and an achromatic second λ/4 plate may be used alternatively, with the direction of the optical axes enclosing an angle of +45° with the first direction of polarization. Achromatic λ/4 plates are supplied by, for example, "Bernhard Halle Nachf. GmbH & Co.".

To reduce image errors such as coma, astigmatism and curvature of the field, a plurality of the curved surfaces of the optical elements in the above-described embodiments of the head-mounted display, for example, the curved surfaces of the semi-transmissive hollow mirror 205, are preferably given an aspherical shape.

To further simplify the assembly of the head-mounted display, a plurality of optical elements, for example, the semi-transmissive mirror, the lens element, the second λ/4 plate and a polarization-dependent mirror may be integrated in an optical part. Both the λ/4 plate and the polarization-dependent mirror may then be curved.

Figure 3:
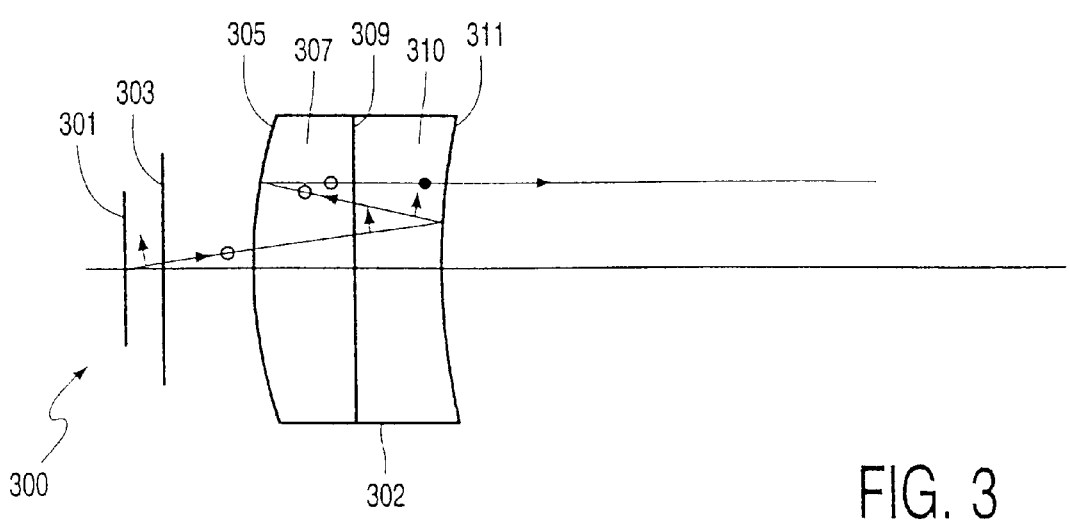
FIG. 3 shows a third embodiment of a head-mounted display according to the invention.

FIG. 3 shows an example of a segment 300 of a head-mounted display in accordance with the invention, comprising an image display device, for example, a transmissive liquid crystalline panel 301, and an optical system. The optical system comprises a first λ/4 plate 303 and an integrated optical part 302 in which, in this order, along the optical axis of the optical system, the semi-transmissive mirror 305, a first lens element 307, a second λ/4 plate 309, a second lens element 310 and the polarization-dependent mirror 311 are integrated. The semi-transmissive mirror 305 is formed by a semi-transmissive layer provided on a first surface of the first lens element 307. The second λ/4 plate 309 comprises, for example, a λ/4 foil which is provided on a second surface of the first lens element 307. Moreover, a first surface of the second lens element 310 adjoins the λ/4 foil 309. The polarization-dependent mirror 311 is arranged on a second surface of the second lens element 307, for example, by providing a reflective polaroid of the type DBEF on said second surface. Moreover, both the first and the second lens element 307, 310 may be made of glass or polycarbonate. When the head-mounted display is operative and is worn by the user, radiation of a pixel of the image formed by the liquid crystalline image display panel 301 will be incident on the first λ/4 plate 303. The angle between the optical axis of the first λ/4 plate 303 and the first direction of polarization is, for example, +45°. The first λ/4 plate 303 converts the radiation polarized in a first direction into circularly polarized radiation, for example, dextrorotatory polarized radiation which is incident on the semi-transmissive mirror 305. The semi-transmissive mirror 305 passes a part of the dextrorotatory polarized radiation to the λ/4 foil 309 via the first lens element 307. The optical axis of the λ/4 foil 309 extends at an angle of −45° with respect to the first direction of polarization, hence transverse to the optical axis of the first λ/4 plate 303. The λ/4 foil 309 converts the dextrorotatory polarized radiation into radiation polarized in a first direction. The radiation polarized in the first direction passes through the second lens element 310 and is subsequently incident on the reflective polaroid 311. The reflective polaroid 311 reflects all of the radiation polarized in the first direction back towards the λ/4 foil 309 via the second lens element 310. The λ/4 foil 309 converts the radiation polarized in the first direction into dextrorotatory polarized radiation which is incident on the hollow semi-transmissive mirror 305 via the lens element 307. The semi-transmissive mirror 305 reflects a part of the dextrorotatory polarized radiation back towards the λ/4 foil 309 via the lens element 307 and changes dextrorotatory polarization into levorotatory polarization. The λ/4 foil 309 converts the levorotatory polarized radiation into radiation polarized in the second direction which is transverse to the first direction of polarization. The radiation polarized in the second direction is subsequently incident again on the reflective polaroid 311 via the second lens element 310. However, the reflective polaroid 311 now passes the radiation polarized in the second direction to a user's eye (not shown).

Instead of a transmissive liquid crystalline image display panel in the embodiments of the head-mounted display described above, a reflective liquid crystalline image display panel with an associated illumination system may be used alternatively. A cathode ray tube in combination with a linear polarizer, which has its director in the first direction, may also be used.

What is claimed is:

1. A head-mounted display provided with an image display device and an optical system comprising a semi-transmissive mirror, a lens element, a polarization-dependent mirror and two λ/4 plates for combining light beams so as to project an image to be formed by the image display device on a user's retina, characterized in that, viewed from the image display device, the first λ/4 plate, the semi-transmissive mirror, the lens element, the second λ/4 plate and the polarization-dependent mirror are placed one behind the other.

2. A head-mounted display as claimed in claim 1, characterized in that an optical axis of the first λ/4 plate is transverse to an optical axis of the second λ/4 plate.

3. A head-mounted display as claimed in claim 1, characterized in that the head-mounted display comprises an integrated optical part in which the semi-transmissive mirror, the lens element, the second λ/4 plate and the polarization-dependent mirror are integrated.

4. A head-mounted display as claimed in claim 1, characterized in that the head-mounted display comprises at least an optical element having an aspherical surface.

5. A head-mounted display as claimed in claim 1, characterized in that the second λ/4 plate and the polarization-dependent mirror have curved surfaces.

* * * * *